Jan. 9, 1945.    R. H. WHEMPNER    2,367,162
CONTROL APPARATUS
Filed April 20, 1942
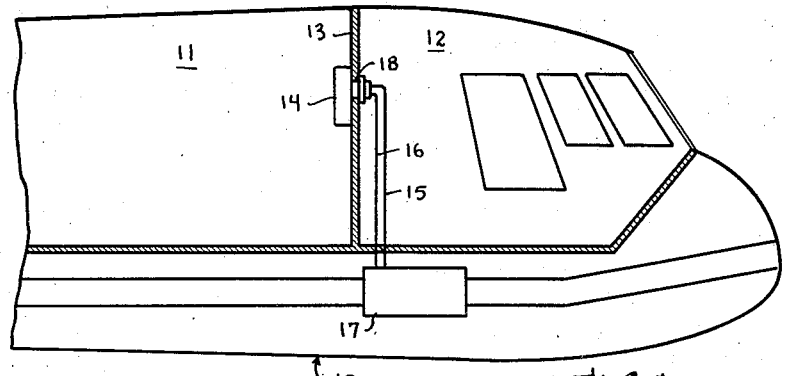
Fig. 1
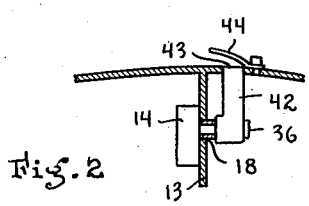
Fig. 2
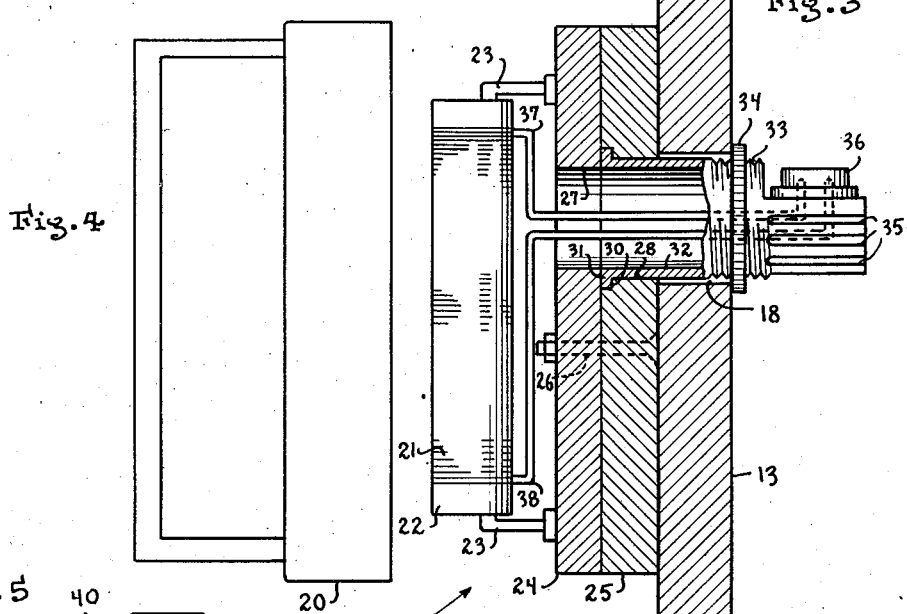
Fig. 4
Fig. 3
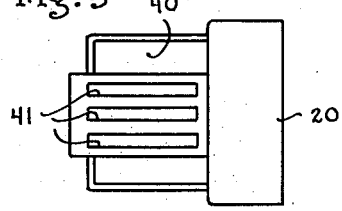
Fig. 5
INVENTOR.
Russell H. Whempner
BY George H. Fisher
ATTORNEY.

Patented Jan. 9, 1945

2,367,162

UNITED STATES PATENT OFFICE 2,367,162

CONTROL APPARATUS

Russell H. Whempner, Minneapolis, Minn., assignor to Minneapolis-Honeywell Regulator Company, Minneapolis, Minn., a corporation of Delaware Application April 20, 1942, Serial No. 439,679

6 Claims. (Cl. 236—1)

The present invention relates to air conditioning control systems in general, and more particularly to condition responsive devices for controlling air conditioning systems in aircraft.

Air conditioning systems generally include a condition responsive device such as a thermostat or a humidostat mounted in the space whose temperature or humidity is to be controlled. The air conditioning means is then controlled in accordance with the variations of the condition responsive device. It is necessary that the condition responsive device be mounted at a point where the ambient air conditions immediately adjacent the device are representative of the air conditions in the space as a whole. The problem of properly locating the condition responsive device is always difficult, and it is sometimes impossible to locate the device in a completely satisfactory place. This problem is particularly difficult in the case of moving vehicles, which have relatively thin outside walls, and are therefore apt to have a very uneven distribution of air conditions in various parts of the vehicle.

It is therefore an object of the present invention to provide a mounting arrangement for a condition responsive device for use in an air conditioning system which shall make the device more accurately indicative of the average air conditions throughout the space in which it is mounted.

A further object of the present invention is to provide improved means for mounting a condition responsive device in a space in such a manner that a current of air is run over the device forcibly, rather than relying on the natural circulation of air in the space to carry it to a point adjacent the condition responsive device.

Another object of the present invention is to provide an improved arrangement for mounting an air condition responsive device in a moving vehicle in such a manner that the external air flow caused by the motion of the vehicle is utilized to create a flow of air over the condition responsive device.

A further object of the present invention is to provide, in an air conditioning system for an aircraft cabin, a mounting for the condition responsive device such that the pressure differential between the passenger cabin and the pilot's compartment, due to motion of the aircraft, is utilized to cause a flow of air from the cabin over the condition responsive device.

Other objects and advantages of the present invention will become apparent upon an inspection of the appended specification, claims and drawing, in which Figure 1 shows somewhat diagrammatically a cross-section of an aircraft, illustrating a preferred method of mounting a condition responsive device in accordance with the principles of my invention, Figure 2 illustrates a modified method of mounting a condition responsive device in accordance with my invention, Figure 3 illustrates a specific form of condition responsive device together with a base and supporting means therefor, which may be used in the system indicated in Figure 1, Figure 4 is a side elevation of a cover for the condition responsive device illustrated in Figure 3, and Figure 5 is a top view of the cover shown in Figure 4.

In Figure 1, 10 indicates generally an airplane of the transport type, having a passenger cabin 11 and a pilot's compartment 12. In various models of the aircraft, the compartment 12 may be subdivided into smaller compartments for use of the stewardess, for baggage, or for other purposes. Such subdivisions of compartment 12 are usually interconnected by passageways in which no doors are provided. The wall 13, between the cabin 11 and the space 12, on the other hand, is usually provided with a door (not shown).

A temperature control system for the cabin 11 is provided, which includes a temperature responsive device 14. This is preferably of the electrical type and is connected by a pair of conductors 15 and 16 to suitable electrical temperature changing means 17. The temperature changing means 17 may be of any suitable type. For example, it may be a temperature controlling arrangement such as that shown in the copending application of Willis H. Gille, Serial No. 439,673, filed April 20, 1942.

The wall 13 is provided with an aperture 18 and the temperature responsive device 14 is mounted in the cabin 11 just over the aperture 18.

In Figure 3 is shown the temperature responsive device 14, with its cover 20 removed. The details of the cover 20 are shown in Figures 4 and 5.

In Figure 3, the temperature responsive device 14 is seen as comprising a coil of wire 21 wound on a suitable bobbin 22. The wire 21 is preferably of some material such as nickel having an appreciable temperature coefficient of resistance.

The bobbin 22 is supported by a pair of brackets 23, attached by any suitable means to a base member 24. The base member 24 and a second base member 25, of similar size and shape are held together by suitable clamping means, which may be a number of bolts and nuts such as the one shown at 26.

The base member 24 is provided with an aperture 27, and the base member 25 is provided with a corresponding aperture 28. The aperture 28 is of slightly greater diameter than the aperture 27, and is provided with a countersunk portion 30 to receive a shoulder 31 on a sleeve or conduit member 32. The construction is such that the two base members 24 and 25, and the sleeve member 32 may be assembled by sliding the sleeve member 32 through the aperture 28 until the shoulder 31 seats on the countersunk portion 30. The base members 24 and 25 are then clamped together by the bolt 26, or other suitable means, thereby holding the sleeve 32 securely.

The external dimensions of the sleeve 32 are such that it will pass readily through the aperture 18 in the wall 13.

A portion of the sleeve 32 spaced from the shoulder 31 is threaded as at 33, so as to receive thereon a knurled ring 34. It will be readily seen that the temperature responsive device 14 may be mounted in the aperture 18 of the wall 13 by first passing the sleeve 32 through the aperture 18, and then applying the ring 34 to the threaded portion 33, turning the ring 34 until it is tight against the wall 13.

Beyond the threaded portion 33, the sleeve member 32 is provided with a number of slots 35 or other suitable openings to permit the escape of air therefrom. There is also mounted at this end of the sleeve 32, an electrical connector 36, which may be of any conventional design.

A pair of conductors 37 and 38 extend from the terminals of the coil 21 through the aperture 27 and the sleeve 32 to the connector 36. The connector 36 is shown as being of the two-conductor, male type, and is adapted to interfittingly receive a corresponding female connector which may be attached to the conductors 15 and 16.

The ends of the casing 20 are provided with suitable apertures such as 40 and 41 in Figure 5, so as to permit the free passage of air therethrough.

When an airplane is in flight, a rapid flow of air takes place past the outer surfaces of the plane. It has been found that, in the forward portions of the plane, such as the pilot's compartment 12, that this rapid flow of air tends to create a reduced pressure condition just outside the walls of the plane. Since the walls of the plane are not completely air-tight, this reduced pressure condition is transmitted through leaks around the windows, rivet holes, etc., thereby tending to reduce the air pressure in the pilot's compartment 12. This reduced pressure condition is not present in the rear compartments of the plane, such as the passenger cabin 11. Therefore, a pressure differential is created between the cabin 11 and the pilot's compartment 12, whenever the airplane is in flight. This pressure differential condition is well known to those familiar with the air transportation art and can be readily verified by opening and closing the door between the passenger cabin and the pilot's compartment of an airplane in full flight. It will be noted that a substantial force is necessary to overcome the pressure differential and open the door. Some airplane manufacturers overcome this phenomenon by placing a screen or other aperture in the door so as to equalize the pressures between the two compartments.

It will be readily understood that if a condition responsive device, such as that shown at 14 in the drawing, is mounted over an aperture in the wall 13 in the manner disclosed in Figure 3, that the pressure differential condition described above will produce a flow of air through the apertures 40, over the coil 21, and through the aperture 27 and sleeve 32. This flow of air brings air quickly from parts of the cabin remote from the device 14, and makes the changes in temperature adjacent the coil 21 accurately representative of the average temperature condition in the cabin 11.

I have disclosed in Figure 2 a modification of my invention which may be used in vehicles where the pressure differential condition described above does not exist. In Figure 2, there is attached to the sleeve 32, besides the connector 36, a duct 42, connecting with a port 43 in the outer surface of the vehicle. The passage of air past the port 43, due to the motion of the vehicle, will tend to suck air through the duct 42, thereby causing a flow of air over the condition responsive device 14. If desired, a suitable shield 44 may be placed over the port 43, with an opening toward the rear of the vehicle. Such a shield will tend to accentuate the suction condition arising due to the motion of the vehicle. The duct 42 is used to avoid mounting the temperature responsive device 14 on an external wall of the vehicle, where it might be adversely affected by outside weather conditions.

While I have shown and described preferred embodiments of my invention, other modifications thereof will readily occur to those skilled in the art, and I therefore wish to be limited only by the scope of the appended claims.

I claim as my invention:

1. A temperature control system for a vehicle, comprising in combination, wall means defining a first space within said vehicle whose temperature is to be controlled, said wall means having an aperture therein, a temperature responsive device, means for mounting said device within said space and in front of said aperture, means defining a second space within said vehicle and adjacent said aperture on the opposite side of said wall means from said device, means effective upon sufficient movement of the vehicle to reduce the air pressure in said second space to a value below that of the air pressure in said first space so as to cause a flow of air over said device and through said aperture, and means operatively connected to said device for controlling the temperature in said first space.

2. In a temperature control system for a vehicle, in combination, wall means defining a first space within said vehicle whose temperature is to be controlled, said wall means having an aperture therein, a temperature responsive device, means for mounting said device within said space and in front of said aperture, means defining a second space within said vehicle and adjacent said aperture on the opposite side of said wall means from said device, and means upon sufficient movement of the vehicle effective to reduce the air pressure in said second space to a value below that of the air pressure in said first space so as to cause a flow of air over said device and through said aperture.

3. In a temperature control system for a vehicle, in combination, wall means defining a space whose temperature is to be controlled, said wall means having an aperture therein, a temperature responsive device, means for mounting said device within said space and in front of said aperture, temperature control means, operating connections between said device and said control means and extending through said aperture, means including outside wall means of the vehicle defining a second space adjacent said aperture on the opposite side of said wall means from said device, and the outside wall means upon sufficient movement of the vehicle effective to reduce the air pressure in said second space to a value below that of the air pressure in said first space so as to cause a flow of air over said device and through said aperture.

4. In an air conditioning system, in combination, wall means defining a first space, said wall means having an aperture therein, an electrical device variable in response to changes in a condition of the ambient air, a base for supporting said device, said base having an aperture of substantially the same cross-sectional area as said wall aperture, a sleeve fixed on said base, substantially surrounding said base aperture and extending substantially through said wall aperture, means cooperating with said sleeve to attach said base and sleeve to said wall, electrical air conditioning means, conductor means connecting said device and said air conditioning means and extending through said sleeve and said apertures, apertured guard means and an electrical connector associated with said sleeve on the side of the wall opposite said device, said guard and connector serving to prevent injury to said conductor means inside said sleeve, and said connector serving as a part of said conductor means, means defining a second space adjacent said aperture on the opposite side of said wall means from said device, and means effective to reduce the air pressure in said second space to a value below that of the air pressure in said first space so as to cause a flow of air over said device and through said aperture.

5. In a temperature control system for aircraft, in combination, first wall means comprising a partition wall defining a compartment near the front of said aircraft and including outside wall means, second wall means including said partition wall defining a passenger cabin to the rear of said compartment, the partition wall having an aperture therethrough, a temperature responsive device, means for mounting said device within said cabin and in front of said aperture, the front portion of the outside wall means upon sufficient movement of the vehicle effective to reduce the air pressure in the front compartment to cause a flow of air over said device and through the said aperture, and means operatively connected to said device for controlling the temperature in said passenger cabin.

6. In an air conditioning system, in combination, an electrical control device variable in response to a change in a condition of the ambient air, an elongated casing for said control device including apertures in opposite ends thereof, a base for supporting said device and said casing, said base having an aperture therein at a point intermediate the apertures in said casing, electrical connectors attached to said device and extending through said base aperture, and conduit means adapted for mounting in alignment with said aperture, said conduit means including electrical connector means and having air passage means therein so that in the event a pressure differential exists between the interior of said casing and the exterior of said conduit means, air may flow through said casing and said conduit means.

RUSSELL H. WHEMPNER.